Patented Nov. 2, 1926.

1,605,663

UNITED STATES PATENT OFFICE.

CHARLES F. KETTERING AND THOMAS MIDGLEY, JR., OF DAYTON, OHIO, ASSIGNORS, BY MESNE ASSIGNMENTS, TO GENERAL MOTORS CORPORATION, OF DETROIT, MICHIGAN, A CORPORATION OF DELAWARE.

MOTOR FUEL.

No Drawing. Application filed April 15, 1922, Serial No. 553,040, and in Great Britain May 7, 1919.

This invention relates to internal-combustion engines and fuels for the same. The efficiency of engines of this type has been limited by the characteristic, common to many engine fuels, that a fuel knock is produced in the engine when a fuel mixture is ignited while subjected to a relatively high pressure. The highest pressure at which a mixture may be burned in a cylinder without producing a knock varies with the different fuels and to some extent with the temperature and other conditions within the engine and this pressure is generally termed the "critical compression pressure" of the fuel.

Engine compression is a large factor in determining engine efficiency, size of engine employed, and weight of parts such as tires, springs, and axles which support the engine. By increasing engine compression the amount of fuel required to perform a given amount of work is materially reduced thus reducing the quantity of fuel consumed each year and conserving the fuel supply. An increase in engine compression effects a marked saving in fuel consumed through a more efficient use of the fuel and the use of lighter vehicles propelled by internal-combustion engines. The use of high compression engines is now relatively limited because fuels such as benzol and certain special grades of gasoline having relatively high critical compression pressures are not universally available in sufficient quantities for general use. To promote a more general use of these high compression engines and the use of engines of still higher compression it is desirable that the fuel base or major constituent of the fuels having high critical compression pressures consist chiefly of a hydro-carbon fuel which is universally available to the consumer in large quantities.

The principal objects of our invention are to treat the common engine fuels such, for example, as gasoline, kerosene, and the heavier hydrocarbons, to increase their critical compression pressures without appreciably diluting them or changing their heating value and, to permit an increase in the compression pressure of an engine and the critical compression pressure of the common fuels to obtain a higher engine efficiency and a more economical use of the common fuels.

Kerosene and gasoline are obtainable in different grades or qualities. The average critical compression pressure of the kerosene now on the market is about 50 pounds and that of the commoner forms of commercial gasoline is about 75 pounds. We have found that by adding relatively small quantities of certain substances to either of the above named fuels, the critical compression pressure of the fuel is appreciably increased. By way of example we have found that a mixture consisting by volume of 96½% kerosene and 3½% aniline oil ($C_6H_5.NH_2$) has a critical compression pressure of substantially 75 pounds. The presence of the aniline oil in the kerosene has changed the low compression fuel to a higher compression fuel (having a higher critical compression pressure) which, at least as far as the fuel knock is concerned, may be used in place of the common forms of gasoline in internal-combustion engines designed to run on gasoline. Owing to the fact that the proportional quantity of the aniline oil employed is very small for the increase in the critical compression pressure obtained, the heating value of the mixture is practically the same as that of the fuel base (kerosene) and the major constituent of the fuel mixture is the fuel which normally has a relatively low critical compression pressure.

Heating the kerosene and aniline to about 60° centigrade assists materially in dissolving the aniline in the gasoline. Agitation of a mixture of aniline and kerosene also assists in effecting the solution. If desired a carrier or binder may be employed to combine the aniline with the kerosene. A small quantity of gasoline serves as a good carrier but other substances such as amyl alcohol, amyl acetate and orthotoluidine may be used. When employing gasoline as a carrier, substantially 30 parts by volume of aniline may be dissolved in 100 parts of gasoline by heating or agitating the mixture and this master solution may then be added to a larger quantity of gasoline without heating the larger quantity. 15 parts by volume of amyl alcohol or amyl acetate may be combined with 100 parts of aniline or 50 parts by volume of orthotoluidine may be combined with 50 parts of aniline, these combinations or mixtures being readily effected and then added to the gasoline to be treated. Orthotoluidine has the advantage that it is also a knock suppressor and the amyl acetate has the advantage that it prevents a freezing out of the aniline from the gasoline at low temperature. The method of mixing the knock suppressor with a fuel by the use of a carrier or binder is useful where the knock suppressor is added to the fuel by the consumer, for the solutions in the gasoline are more readily produced and the knock suppressor is diluted making it easier to measure the small quantities to be added for each gallon of fuel used. This method is especially important where a consumer is using a high compression engine in a locality where only low compression fuels are available and it is necessary to treat the fuel at the time it is purchased.

The proportional quantity of the knock suppressing substance employed and the amount the engine compression pressure is increased over the normal critical compression pressure of the fuel before treatment may depend upon the use to which the engine is put. For example, in a truck motor it may be found desirable to employ a relatively small proportioned quantity of a knock suppressing substance of the type defined above in low grade gasolines or in kerosene to avoid the fuel knock commonly produced in truck engines in climbing hills. When employing the invention in automobile engines, the engine compression pressure may be increased to a point between the normal critical compression pressure of the untreated fuel and 160 or more pounds to reduce the weight of the engine and other parts of the vehicle and increase the mileage, it being preferred to increase the engine compression to about 160 pounds. The invention may be employed in aircraft constructions by treating the commoner forms of aviation gasolines which are now employed in engines having a compression pressure of about 125 pounds to increase the compression pressure of aircraft engines and so increase their efficiency. The term "high compression fuel" or the term "a fuel having a relatively high critical compression pressure" is employed herein to designate a fuel having as its fuel base a constituent having a lower critical compression pressure which constituent is treated with a knock suppressing substance to increase its critical compression pressure.

The mixture of fuel and knock suppressing substance may be varied by employing other fuel bases, by using other substances to increase the critical compression pressure of the fuel base and by varying the proportions used. For example, gasoline or other hydrocarbon fuels containing paraffine series hydrocarbons which may be obtained from an asphalt, naphthene, paraffine or mixed base crude may be employed in place of the kerosene, and elemental iodine or ethyl iodide may be employed in place of the aniline oil, the proportions being varied according to the normal critical compression pressure of the fuel, the compression pressure of the engine in which the fuel is to be used and the effectiveness of the substance mixed with the fuel to increase its critical compression pressure. Elemental iodine and ethyl iodide increase the critical compression pressure of either kerosene or gasoline at least 5 pounds for each per cent by volume or either of these substances present in the fuel.

Aniline oil is one of a large number of amino compounds which suppress knocking. The amino compounds are hydrocarbon derivatives of ammonia in which one or more of the three hydrogen atoms of the ammonia molecule are replaced by hydrocarbon radicals. The type of organic radical replacing the hydrogen in the ammonia determines largely the effectiveness of the amino compound as an anti knock material. Amino compounds, such as aniline, containing aromatic type radicals are generally stronger knock suppressors than amino compounds containing only alkyl radicals of which ethyl amine is an example. An NH amino compound secondary amine may be a better knock suppressor than an $NH_2$ amino compound primary amine and generally speaking, different hydrocarbon radicals may be substituted for the second hydrogen atom and the different compounds thus formed will have substantially the same value in avoiding a knock in a motor. For example mono-ethyl or mono-methyl aniline have about the same value and either one is stronger than aniline. Di-phenyl amine has about the same value (on a molecular basis) in suppressing knock as mono-methyl aniline. The substitution of a hydrocarbon radical for the third hydrogen atom of ammonia generally reduces the effectiveness of the amino compound. For example di-methyl aniline is about one fourth as effective as mono-methyl aniline. Xylidine and other homologues and pseudo-homologues of aniline and fifteen or more of the common and rarer amines have been successfully employed in suppressing a fuel knock in a motor. Other amino compounds which have been used successfully in suppressing a knock are orthotoluidine, cumidine, mono-propyl aniline, mono-butyl aniline, mono-amyl aniline, mono-methyl orthotoluidine, meta toluidine, mono-methyl xylidine, di-phenyl amine, amino-diphenyl, naphthyl-amine and phenylene di-amine.

These compounds are known generally as amines including compounds such as aromatic amines, aliphatic amines, and mixed aromatic-aliphatic amines in which a nitrogen atom is attached to at least one aromatic hydrocarbon radical. Among the aromatic amines are the primary, secondary, and tertiary amines, containing only aromatic radicals attached to nitrogen. Among the mixed aromatic-aliphatic amines are included secondary and tertiary amines. Examples of these classes of substitution products of ammonia are given above.

Owing to the fact that the substances named dissolve in the hydrocarbon fuels, they may be combined readily with the latter to form a homogeneous mixture. However we do not limit our invention wholly to the use of substances which dissolve in the fuel but may employ a substance which may be incorporated in any manner with the latter, dissolving being the preferred method of effecting the combination.

A mixture consisting of kerosene or gasoline and a substance, such as aniline oil, may be employed in racing engines, and airplane engines commonly run at compressions as high as 125 pounds with substantially the same power output as is now obtained by employing only special grades of gasoline not containing the higher boiling paraffines. These special grades are available only in limited quantities.

By adding aniline or another substance having like properties to a commercial form of hydrocarbon fuel at its source or adding it to the gasoline in the tank of a car or as the gasoline is drawn into an engine, the burning characteristics of the fuel are changed and the operator may avail himself of this change by replacing the pistons with pistons which give higher compressions in the engine and so obtain a higher engine efficiency and a more economical use of the fuel. While our invention may be applied to kerosene to enable the use of the kerosene in gasoline engines, the invention will probably have its greatest utility in the increasing of the compression pressures of gasoline engines in common use and the use in these engines of a treated fuel generally available. A high compression motor and a knock suppressing substance of the type named above form a more efficient means of utilizing the commoner forms of fuel and a more universally available means than the use of benzol or fuel diluents.

We prefer to use the knock suppressing substance in a proportion not exceeding 10% by volume of the treated fuel, chiefly to avoid an undue increase in cost or a reduction of the heating value of the fuel. While it is within the scope of the present invention to employ a knock suppressing substance, such as aniline, which has a heating value when burned in an engine, the invention resides primarily in the use of a substance which will increase critical compression pressures markedly when but a small proportional quantity of the substance is used.

The action of substances such as aniline on fuels is in marked contrast to the effect obtained by merely blending two fuels having markedly different critical compression pressures, which blending gives a fuel having an intermediate critical compression pressure. A mixture consisting by volume of 50% kerosene and 50% benzol has substantially the same critical compression pressure as that produced by adding 3½% of aniline to kerosene. The mixing of the large quantity of benzol with kerosene also dilutes the latter. The action of the aniline-like substances on compression pressures of fuels is also in contrast to the action of inert gases such as exhaust gases which appear to increase slightly the critical compression pressure by diluting the explosive mixture. The dilution of the fuel mixture in the engine cylinder apparently gives a separation of the fuel particles, sufficient to avoid an accumulative effect which results in knocking. Approximately a 10% or greater dilution is required to increase the critical compression pressure of a fuel 5 pounds.

Several theories have been advanced for the cause of the knock at high compression and the action of the aniline and other like substances in suppressing the knock but none of these theories, so far as we are aware, has been generally accepted. These substances apparently affect the burning characteristics of the fuel particles or molecules when the mixture is burned while subjected to a relatively high compression. Their action may be to change the reaction velocity of burning of the carbon, or hydrogen or both so as to avoid the formation of detonatable compounds or to avoid the formation, in the neighborhood of the moving flame, of a wave which strikes the cylinder wall and produces the knocking sound. The action of amino compounds, iodine compounds and the like may be catalytic, this term being employed in its broadest meaning. Pressure indicator cards show that an abnormal pressure is formed in the cylinder when the knock occurs and that the use of aniline prevents the development of this abnormal pressure without materially affecting the mean effective pressure at constant throttle opening.

This application is a continuation in part of our prior application, Serial No. 281,741, filed March 10, 1919, on motor fuel.

While the specific examples herein given constitute preferred forms of embodiment of the invention, it is to be understood that other forms might be adopted, without departing from the scope of the claims which follows.

What we claim is as follows:

1. A composition of matter comprising a low compression motor fuel, and a compound consisting of a substitution of at least one monovalent hydrocarbon radical for a hydrogen atom of ammonia.

2. A composition of matter comprising a low compression motor fuel and a primary aromatic amine.

3. A composition of matter comprising a low compression motor fuel and aniline.

4. A composition of matter comprising a low compression motor fuel such as kerosene or gasoline and a relatively small proportion of aniline.

5. A composition of matter comprising a low compression motor fuel containing substantially 3½ percent of aniline.

6. A composition of matter comprising substantially 96½ percent kerosene and 3½ percent aniline.

In testimony whereof we hereto affix our signatures.

CHARLES F. KETTERING.
THOMAS MIDGLEY, Jr.